United States Patent
Ikeda et al.

(10) Patent No.: US 9,067,160 B2
(45) Date of Patent: Jun. 30, 2015

(54) EXHAUST GAS PURIFICATION SYSTEM

(75) Inventors: Takashi Ikeda, Fujisawa (JP); Naofumi Ochi, Kanagawa (JP); Hiroyuki Ishikawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 114 days.

(21) Appl. No.: 13/703,432

(22) PCT Filed: Jun. 10, 2011

(86) PCT No.: PCT/JP2011/063325
§ 371 (c)(1),
(2), (4) Date: Dec. 11, 2012

(87) PCT Pub. No.: WO2011/155590
PCT Pub. Date: Dec. 15, 2011

(65) Prior Publication Data
US 2013/0081543 A1 Apr. 4, 2013

(30) Foreign Application Priority Data
Jun. 11, 2010 (JP) ................................. 2010-134516

(51) Int. Cl.
*B01D 49/00* (2006.01)
*B01D 39/00* (2006.01)
(Continued)

(52) U.S. Cl.
CPC .......... *B01D 46/0063* (2013.01); *F01N 3/0235* (2013.01); *F01N 3/0253* (2013.01);
(Continued)

(58) Field of Classification Search
CPC ......... F01N 3/027; F01N 3/035; F01N 41/40; F01N 3/023; F01N 3/025; F02D 41/029; Y02T 10/47; B01D 46/0063; B01D 2279/30

USPC ........................................... 95/425
See application file for complete search history.

(56) References Cited

U.S. PATENT DOCUMENTS

| | | | |
|---|---|---|---|
| 2004/0133335 A1 | 7/2004 | Nakano et al. | |
| 2006/0260299 A1* | 11/2006 | Wang et al. | ...................... 60/297 |

(Continued)

FOREIGN PATENT DOCUMENTS

| | | |
|---|---|---|
| JP | 2000-303826 | 10/2000 |
| JP | 2004-197697 | 7/2004 |

(Continued)

OTHER PUBLICATIONS

Written Opinion of the International Searching Authority mailed Sep. 13, 2011 in corresponding International Application No. PCT/JP2011/063325.

(Continued)

*Primary Examiner* — Amber Orlando
(74) *Attorney, Agent, or Firm* — Staas & Halsey LLP

(57) ABSTRACT

A diesel particulate defuser ("DPD") is connected to an exhaust pipe of a diesel engine, an exhaust gas temperature during automatic regeneration of the DPD is detected, and the difference between the detected exhaust gas temperature and a target regeneration temperature is determined. In a case where an exhaust pipe injection amount is PID controlled based on this difference, when an exhaust brake valve is closed during traveling automatic regeneration, the exhaust pipe injection is stopped and calculation of an integral control term by the PID control is continued as long as the exhaust valve brake valve is closed, and when the exhaust brake valve is opened, the integral control term that has been continuously calculated is taken as an initial operation amount.

4 Claims, 4 Drawing Sheets

(51) Int. Cl.

| | | |
|---|---|---|
| *B01D 41/00* | (2006.01) | |
| *B01D 45/00* | (2006.01) | |
| *B01D 46/00* | (2006.01) | |
| *B01D 50/00* | (2006.01) | |
| *B01D 51/00* | (2006.01) | |
| *F01N 3/023* | (2006.01) | |
| *F01N 3/025* | (2006.01) | |
| *F01N 9/00* | (2006.01) | |
| *F02D 9/06* | (2006.01) | |
| *F01N 13/00* | (2010.01) | |
| *F01N 3/035* | (2006.01) | |
| *F02D 41/02* | (2006.01) | |
| *F02D 41/10* | (2006.01) | |
| *F02D 41/14* | (2006.01) | |
| *F02D 41/40* | (2006.01) | |
| *F02B 29/04* | (2006.01) | |
| *F02M 25/07* | (2006.01) | |

(52) U.S. Cl.
CPC ............ *F01N 3/035* (2013.01); *F01N 9/002* (2013.01); *F01N 2240/36* (2013.01); *F01N 2610/146* (2013.01); *F01N 2900/1404* (2013.01); *F02D 41/025* (2013.01); *F02D 41/029* (2013.01); *F02D 41/107* (2013.01); *F02D 41/1446* (2013.01); *F02D 41/1482* (2013.01); *F02D 41/405* (2013.01); *F02D 2041/1409* (2013.01); *Y02T 10/47* (2013.01); *F02B 29/0406* (2013.01); *F02M 25/0727* (2013.01); *F02D 9/06* (2013.01); *F01N 2900/10* (2013.01); *F01N 13/0097* (2014.06)

(56) References Cited

U.S. PATENT DOCUMENTS

| | | | |
|---|---|---|---|
| 2008/0000219 A1* | 1/2008 | Ratcliff et al. | 60/274 |
| 2008/0295485 A1* | 12/2008 | Wiley et al. | 60/274 |
| 2009/0025372 A1* | 1/2009 | Onodera et al. | 60/286 |
| 2009/0056316 A1* | 3/2009 | Haseyama et al. | 60/286 |
| 2009/0082938 A1* | 3/2009 | Onodera et al. | 701/103 |
| 2009/0145115 A1* | 6/2009 | Torisaka | 60/286 |

FOREIGN PATENT DOCUMENTS

| | | |
|---|---|---|
| JP | 4175281 | 10/2005 |
| JP | 2006-266219 | 10/2006 |
| JP | 2008-542950 | 11/2008 |
| JP | 2009-174513 | 8/2009 |
| WO | WO 2006/132943 | 12/2006 |

OTHER PUBLICATIONS

Patent Abstracts of Japan, Publication No. 2005-282545, Published Oct. 13, 2005.
Patent Abstracts of Japan, Publication No. 2000-303826, Published Oct. 31, 2000.
Patent Abstracts of Japan, Publication No. 2004-197697, Published Jul. 15, 2004.
Patent Abstracts of Japan, Publication No. 2006-266219, Published Oct. 5, 2006.
Patent Abstracts of Japan, Publication No. 2009-174513, Published Aug. 6, 2009.
International Search Report of PCT/JP2011/063325 mailed Sep. 13, 2011.

* cited by examiner

EXHAUST GAS PURIFICATION SYSTEM

CROSS REFERENCE TO RELATED APPLICATIONS

This application claims the foreign priority benefit of Japanese Application No. 2010-134516 filed Jun. 11, 2010, the contents of which are incorporated herein by reference, which serves as priority for PCT Application No. JP2011/063325 filed Jun. 10, 2011.

TECHNICAL FIELD

The present invention relates to an exhaust gas purification system that collects PM (Particulate Matter) contained in exhaust gas from a diesel engine and also decreases $NO_x$ and discharges the purified exhaust gas, and more particularly to a system for exhaust gas purification when a vehicle is accelerated or decelerated during automatic regeneration of a diesel particulate defuser (DPD).

BACKGROUND ART

An exhaust gas purification system in which a DPD and a SCR (Selective Catalytic Reduction) device are connected to an exhaust pipe has been developed for purifying and discharging exhaust gas from diesel engines.

In such an exhaust gas purification system, PM contained in the exhaust gas is collected by the DPD. Further, in the SCR system provided with a SCR device in such exhaust gas purification system, urea water stored in an urea tank is supplied to the exhaust gas upstream of the SCR, ammonia is generated by the heat of the exhaust gas, and $NO_x$ is reduced and decreased on the SCR catalyst by the ammonia (see, for example, Patent Documents 1 and 2).

Since the PM collected by the DPD causes clogging of the filter, regeneration should be performed by oxidizing, as appropriate, and removing the collected and deposited PM.

In the case where the detection of clogging is performed automatically by an ECU (Engine Control Unit) or manually when the difference between the pressure detected by exhaust gas pressure sensors before and after the DPD reaches an upper limit value, a DPD alarm lamp provided inside a cabin is lit up and the driver starts the DPD regeneration by pushing a regeneration execution switch.

The DPD is constituted by a DOC (Diesel Oxidation Catalyst) constituted by an active catalyst that oxidizes the unburned fuel and a CSF (Catalyzed Soot Filter) that collects the PM contained in the exhaust gas.

The DPD is regenerated by performing multi-injection (pilot injection, pre-injection, main injection, after-injection) of fuel to raise the exhaust gas temperature to a temperature equal to or higher than the catalyst activation temperature of the DOC, then adding post-injection, raising the exhaust gas temperature to a temperature equal to or higher than 500° C., and removing the PM collected on the CSF by burning with such high-temperature exhaust gas. However, where post-injection is performed, fuel oil mixes with the lubricating oil of cylinders, thereby diluting the lubricating oil. Therefore, the DPD regeneration is performed by the so-called exhaust pipe injection in which fuel (HC) is injected in the exhaust pipe upstream of the DPD.

In the exhaust pipe injection, the DPD regeneration is performed in an automatic mode as the vehicle travels and in a manual mode by idle rotation after the vehicle has been stopped, in the same manner as in the post-injection. Usually the automatic regeneration is performed as the vehicle travels, but because the vehicle travels during the regeneration, the exhaust gas temperature is unstable and PM burning residue easily appears inside the DPD when the vehicle is repeatedly accelerated and decelerated. Accordingly, when the regeneration interval is short and the automatic regeneration of the DPD is performed repeatedly, the driver is encouraged to perform manual regeneration, and the driver removes the PM present in the DPD by manual regeneration by pushing the manual regeneration execution switch after the vehicle has been stopped.

Further, when the vehicle is stopped during traveling automatic regeneration, the regeneration is continued by closing an exhaust gas brake valve to prevent the exhaust gas temperature from decreasing, so as to enable the regeneration also by idle rotation.

In such automatic regeneration, the temperature of the exhaust gas flowing into the CSF is detected with an exhaust gas temperature sensor provided downstream of the DOC, a difference between this exhaust gas temperature and a target regeneration temperature is determined, and the exhaust pipe injection amount is proportional integral derivative (PID) controlled based on this difference so as to obtain the target regeneration temperature. Here, P is a proportional control term, I is an integral control term, and D is a derivative control term. In the proportional control term (P term), the operation amount is changed proportionally to the difference, in the integral control term (I term), the differences are added up and the operation amount is changed proportionally to the value obtained, thereby eliminating the residual difference (stationary difference) present in the proportional control, and in the derivative control term (D term), the variation rate of the difference is converted into a speed, and the operation amount proportional thereto is outputted, thereby increasing the response rate and ensuring rapid convergence to the set value.

PRIOR ART DOCUMENTS

Patent Document 1: Japanese Patent Application Publication No. 2000-303826
Patent Document 2: Japanese Patent No. 4175281

When deceleration is performed by closing the exhaust brake valve to increase the deceleration power during the traveling automatic regeneration, control is conducted to stop the exhaust pipe injection performed with the exhaust pipe injector with consideration for heat of the exhaust pipe itself and a high exhaust gas pressure. Further, the PID control is typically stopped when the exhaust pipe injection is stopped.

Meanwhile, in a traveling mode in which the exhaust brake valve is used repeatedly when the vehicle travels, this mode requiring even greater deceleration power due to rapid acceleration and a large weight of the vehicle, or when the exhaust brake valve is used to maintain deceleration on a downhill road or the like, the amount of exhaust gas passing through the DPD increases rapidly when the vehicle is rapidly accelerated after the exhaust brake valve has been used, the interior of the DPD is scavenged, and the DPD temperature can drop due to a stopped exhaust pipe injection during subsequent downhill travel. When the conventionally used exhaust pipe injection stop and PID recalculation are performed under such circumstances, for example, when the exhaust brake valve is repeatedly used and acceleration is repeated with short intervals, since the PID control recalculation caused by the stopped exhaust pipe injection is performed each time the exhaust brake valve is used during traveling automatic regeneration, the operation amount obtained by the immediately preceding integration in the integral control term is set to zero and the difference is integrated again. The resultant problem is that the necessary integration is not performed, a time is required to raise the exhaust gas temperature to the target regeneration temperature, and in the worst case scenario the regeneration temperature taken as a target can never be reached.

Meanwhile, it is also possible that the injection amount of the exhaust pipe injector itself will drop under the effect of carbon deposited on the injector surface in the exhaust pipe injector, and adequate increase in PID controllability is also necessary from the standpoint of increasing the regeneration temperature increase capability and improving the durability of the exhaust pipe injector against the adhesion of foreign matter,

SUMMARY OF THE INVENTION

Accordingly, it is an object of the present invention to resolve the above-described problem and provide an exhaust gas purification system in which exhaust pipe injection by PID control can be accurately controlled in traveling automatic regeneration even with repeated acceleration and deceleration or even when the exhaust brake valve is closed.

In order to attain the abovementioned object, the invention provides an exhaust gas purification system in which a DPD for collecting PM contained in exhaust gas is connected to an exhaust pipe of a diesel engine, and when an amount of PM in the DPD becomes equal to or greater than a predetermined amount, an exhaust gas temperature of the diesel engine is increased by performing exhaust pipe injection and the DPD is automatically regenerated, wherein an exhaust gas temperature during automatic regeneration is detected, a difference between the detected exhaust gas temperature and a target regeneration temperature is determined, and in a case where an exhaust pipe injection amount is PID controlled based on the difference, when an exhaust brake valve is closed during traveling automatic regeneration, the exhaust pipe injection is stopped and calculation of an integral control term by the PID control is continued as long as the exhaust valve brake valve is closed, and when the exhaust brake valve is opened, the integral control term that has been continuously calculated is taken as an initial operation amount.

The PID control can be reset when the exhaust brake valve is continuously closed for a time equal to or longer than a predetermined time.

The PID control can be reset when a vehicle is stopped after deceleration.

Further, exhaust pipe injection can be continuously performed by the PID control when the exhaust brake valve is opened and the vehicle is decelerated.

Effects of the Invention

The present invention demonstrates the following excellent effect. Thus, the exhaust pipe injection amount can be accurately controlled by PID control according to the operation state during traveling automatic regeneration.

BRIEF DESCRIPTION OF THE DRAWINGS

FIG. 4 is a chart illustrating the relationship between the exhaust pipe injection, exhaust brake valve, integral control term of PID control, and exhaust gas temperature during traveling automatic regeneration in accordance with the present invention and in the conventional example.

Preferred embodiments of the present invention will be described in detail hereinbelow with reference to the appended drawings.

Figure 1:
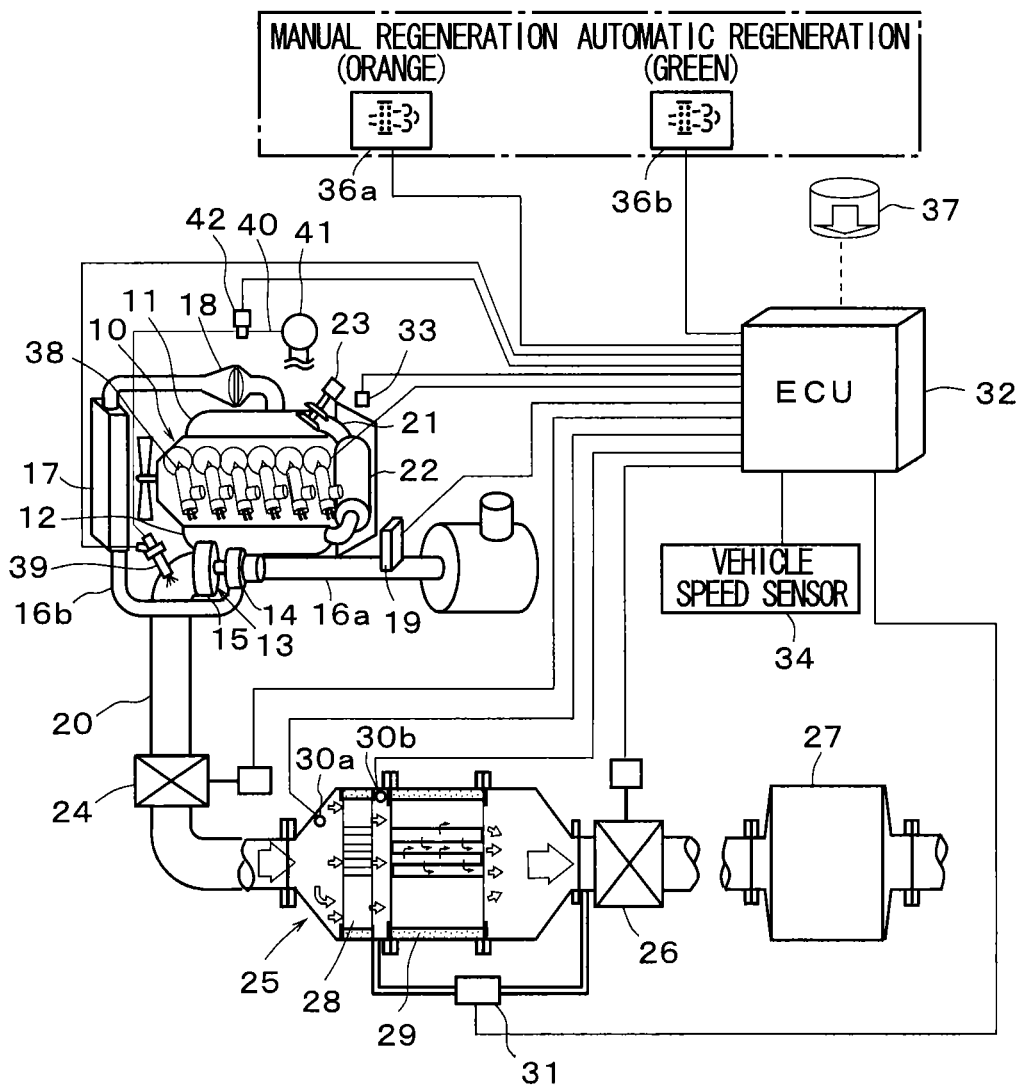
FIG. 1 shows the entire configuration of one embodiment of the present invention.

In FIG. 1, an intake manifold 11 and an exhaust manifold 12 of a diesel engine 10 are respectively connected to a compressor 14 and a turbine 15 of a supercharger 13, the air from an upstream intake pipe 16a is pressurized by the compressor 14, cooled when passing through an intercooler 17 of a downstream intake pipe 16b, and supplied from the intake manifold 11 via an intake throttle valve 18 into the diesel engine 10. The exhaust gas from the diesel engine 10 is discharged into an exhaust pipe 20 after driving the turbine 15.

A mass air flow sensor (MAF) 19 that measures the intake amount is provided in the upstream intake pipe 16a, and the degree of opening of the intake throttle valve 18 is controlled and the intake amount is adjusted by the mass air flow sensor (MAF). An EGR (Exhaust Gas Recirculation) pipe 21 for returning part of the exhaust gas into the intake system of the engine 10 and reducing the amount of NOx is connected to the exhaust manifold 12 and the intake manifold 11, and an EGR cooler 22 and an EGR valve 23 are connected to the EGR pipe 21.

An exhaust brake valve 24, a DPD 25, an exhaust throttle valve 26, and a silencer 27 are connected to the exhaust pipe 20. The DPD 25 is constituted by a DOC 28 constituted by an active catalyst that oxidizes the unburned fuel and a CSF (Catalyzed Soot Filter) 29 that collects PM contained in the exhaust gas.

An exhaust pipe injector 39 that injects fuel (exhaust pipe injection) into the exhaust pipe 20 with the object of increasing the exhaust gas temperature during DPD regeneration is provided upstream of the exhaust brake valve 24. A fuel filter 41 that removes foreign matter or moisture that is mixed with or generated in the fuel is connected to a fuel supply line 40 supplying fuel from a fuel tank (not shown in the figure) to the exhaust gas injector 39. A fuel pressure sensor 42 that measures the fuel pressure of the exhaust pipe injector 39 is provided downstream of the fuel filter.

A SCR device that denitrifies NOx with ammonia is connected between the exhaust throttle valve 26 and the silencer 27 (this configuration is not shown in the figure).

Exhaust gas temperature sensors 30a, 30b are provided before and after the DOC 28, respectively, a differential pressure sensor 31 is provided to detect a PM accumulation amount in the CSF 29, and the detection values of the sensors are inputted to an ECU (electronic control unit) 32.

The detection value of a rotation speed sensor 33 detecting the rotation speed of the engine and the detection value of a vehicle speed sensor 34 are inputted to the ECU 32.

The ECU 32 controls the fuel injection amount in the fuel injector 38 according to the accelerator depression amount during traveling and also controls, as appropriate, the intake throttle valve 18, exhaust brake valve 24, exhaust throttle valve 26, and EGR valve 23.

In such an exhaust gas treatment system, when the ECU 32 determines that a predetermined amount of PM has accumulated in the DPD 25 based on the detection value of the differential pressure sensor 31 detecting the difference in pressure before and after the CSF 29, or when the travel distance after the previous regeneration reaches a predetermined value, regeneration is performed by finally raising the exhaust gas temperature to about 600° C. and burning the PM.

In the regeneration, multi-injection (pilot injection, pre-injection, main injection, and after-injection) is performed with the fuel injector 38 to obtain a temperature equal to or higher than the catalyst activation temperature in the DOC 28, and the PM is then burned by raising the exhaust gas temperature, for example, to 500° C. and then 600° C. by performing exhaust pipe injection of the fuel into the exhaust pipe 20 with the exhaust pipe injector 39. Automatic regeneration is usually performed during traveling, and in this period the ECU 32 lights up an automatic regeneration lamp 36b during the regeneration. In the automatic regeneration, where the traveling vehicle is repeatedly accelerated and decelerated, the exhaust gas temperature becomes unstable, a PM combustion residue appears in the DPD 25, and the regeneration interval is shortened. In this case, the manual regeneration lamp 36a is lit up, the driver is encourage to perform manual regeneration, and the driver regenerates the DPD 25 by manual regeneration by pushing a manual regeneration execution switch 37 after the vehicle has been stopped.

Figure 2:
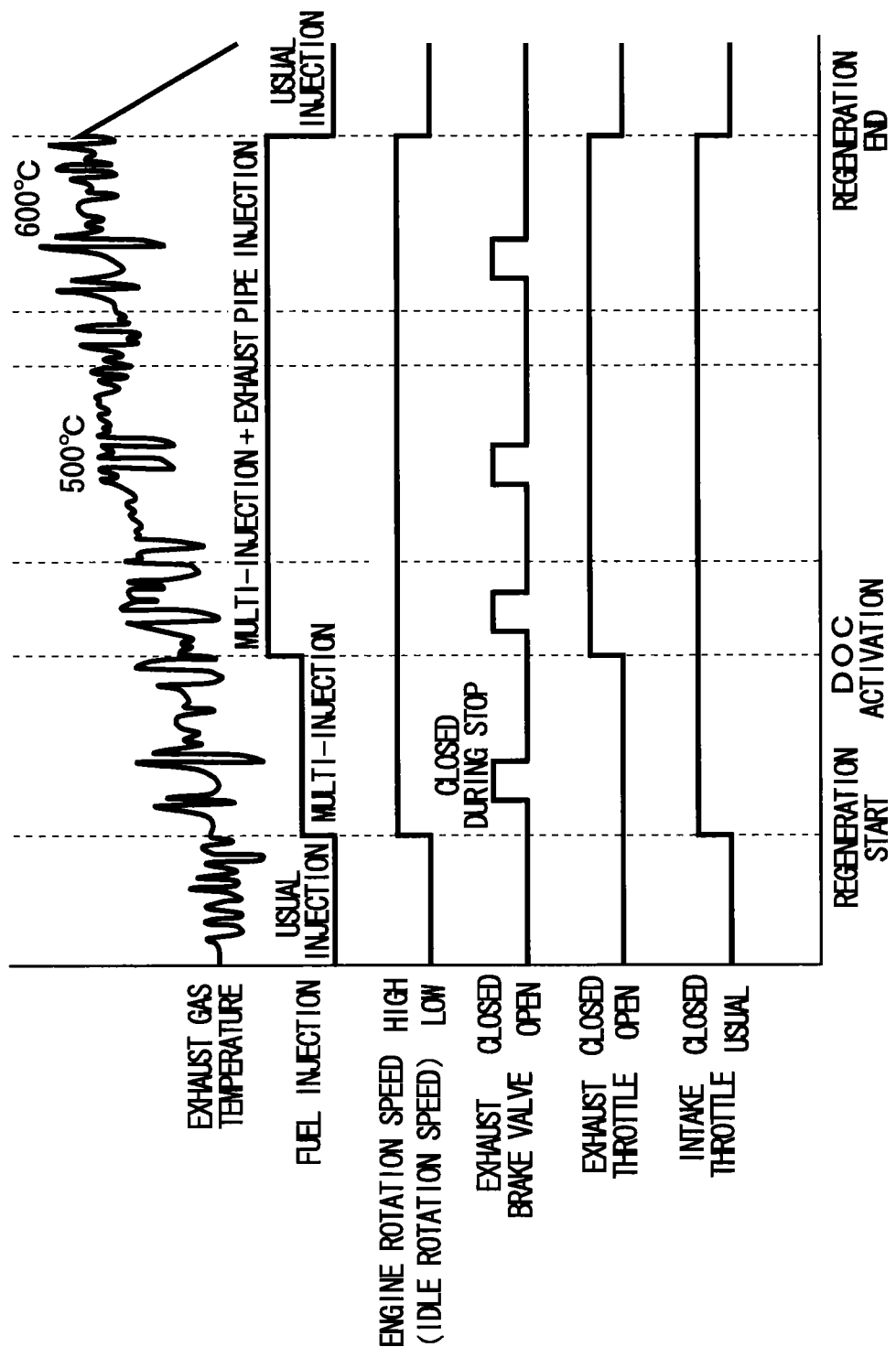
FIG. 2 is a control chart relating to automatic regeneration in accordance with the present invention.

The control chart of the ECU 32 during automatic regeneration is explained below with reference to FIG. 2.

When automatic regeneration is to be conducted, the ECU 32 throttles the intake throttle valve 18, induces multi-injection to raise the exhaust gas temperature to a value equal to or higher than the catalyst activation temperature, and then adds the exhaust pipe injection performed by the exhaust pipe injector 39 to the multi-injection, thereby finally raising the temperature to about 600° C., burning the PM and regenerating the DPD 25. Since the regeneration involves the exhaust pipe injection, the EGR valve 23 is used for reducing the amount of NOx. After the regeneration is completed, the intake throttle valve 18 is returned to the usual control.

When the vehicle stops, e.g., at the traffic light, during the automatic regeneration, the engine rotation speed is increased from the usual idle rotation speed so that the regeneration idle rotation speed is higher than the usual rotation speed when the transmission gear is in neutral, and when the gear is shifted, the regeneration idle rotation speed is set lower than the regeneration idle rotation speed in neutral to prevent the vehicle from moving abruptly from the stop. Further, during the automatic regeneration, the ECU 32 lights up the automatic regeneration warning lamp 36b.

Figure 3:
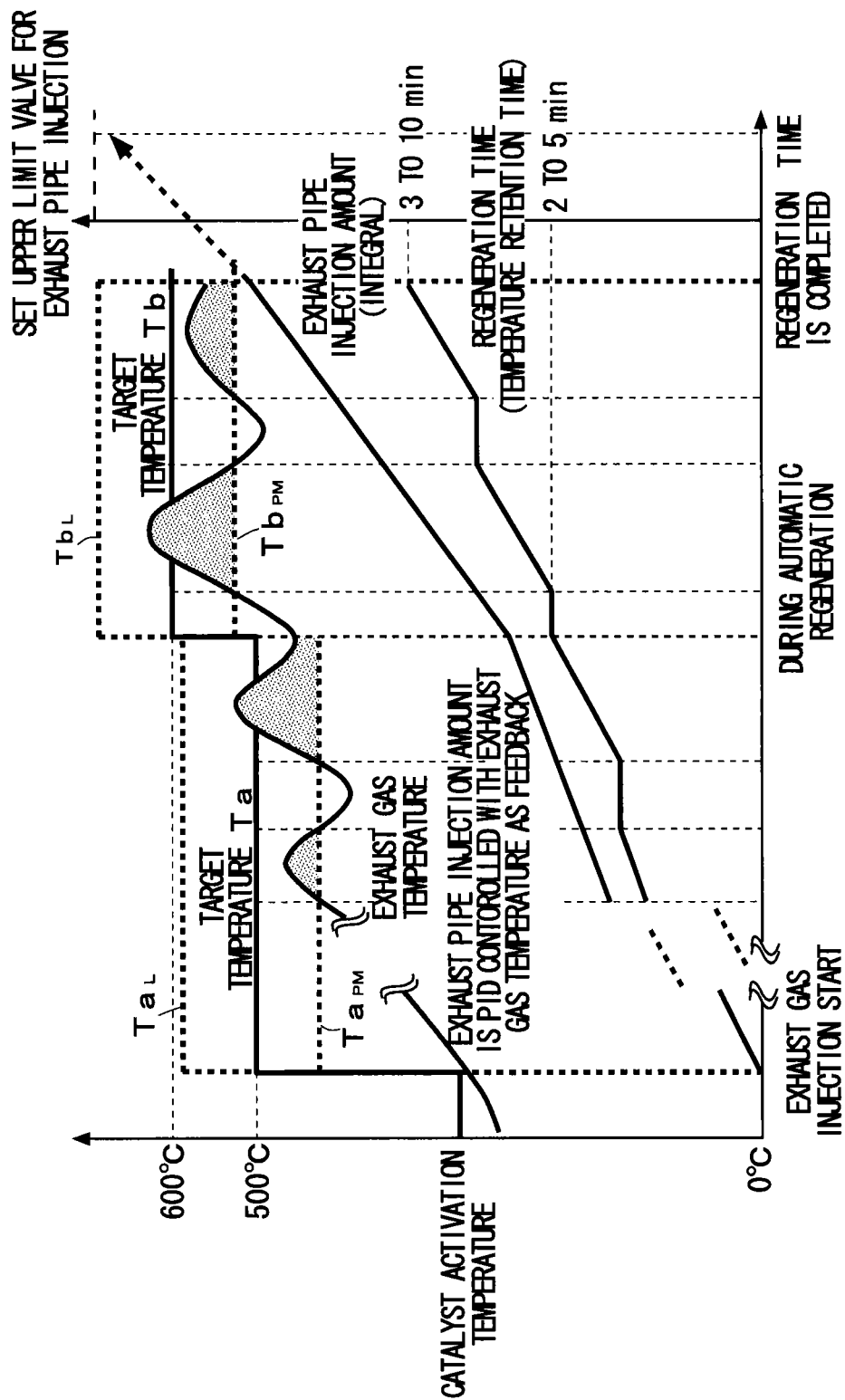
FIG. 3 is a control chart relating to traveling automatic regeneration and idle automatic regeneration during automatic regeneration in accordance with the present invention.

FIG. 3 shows a chart for counting the exhaust gas target temperature, the integral value of the exhaust pipe injection amount, and the regeneration time during automatic regeneration.

When the DPD is regenerated by adding exhaust pipe injection to the multi-injection, the exhaust pipe injection amount is controlled, for example, in a manner such that the initial target regeneration temperature is set, for example, to about 500° C., and where the PM in the DPD is burned to a certain degree, the target temperature is changed and the final target regeneration temperature is set to a temperature higher than the initial target regeneration temperature, for example, about 600° C., in order to prevent the accumulated PM from burning instantaneously when the exhaust gas temperature is raised.

In this case, the ECU 32 sets a PM burning determination temperature $Ta_{PM}$ that is shown by a dot line in the figure and is lower than an initial target regeneration temperature Ta by a predetermined temperature, assumes that the PM is burned when the exhaust gas temperature is equal to or higher than the PM burning determination temperature $Ta_{PM}$, integrates the burning time, changes the temperature to the next final target regeneration temperature Tb when the integral time becomes for example 2 min to 5 min, sets a PM burning determination temperature $Tb_{PM}$ that is likewise lower than the final target regeneration temperature Tb, assumes that the PM is burned when the exhaust gas temperature is equal to or higher than the PM burning determination temperature $Tb_{PM}$, integrates the burning time, and ends the regeneration, for example, when the integral time is 3 min to 10 min after the temperature has been changed.

Further, when the time period in which the exhaust gas temperature rises to a value equal to or higher than the PM burning determination temperatures $Ta_{PM}$, $Tb_{PM}$ is short and the integral time is not counted, the ECU 32 determines that the regeneration has not yet ended when the value obtained by integrating the exhaust pipe injection amount is equal to or higher than the upper limit value that has been set for the exhaust pipe injection.

The upper limit temperatures $Ta_L$, $Tb_L$ which are higher than the target regeneration temperatures Ta, Tb and at which the exhaust pipe injection is possible are set during the automatic regeneration, and the exhaust pipe injection is interrupted to prevent the DPD from melting through when the exhaust gas temperature is equal to or higher than the upper limit temperatures $Ta_L$, $Tb_L$ at which the exhaust pipe injection is possible.

When the manual regeneration is to be performed, the ECU 32 lights up the manual regeneration lamp 36a to warn the driver about manual regeneration, and upon receiving the warning, the driver stops the vehicle and pushes the manual regeneration execution switch 37 of the DPD 25, thereby starting the manual regeneration.

During the manual regeneration, the ECU 32 raises the engine rotation speed from the idle rotation speed to the regeneration idle rotation speed, throttles the intake throttle valve 18, closes the EGR valve 23 and also closes the exhaust brake valve 24, performs multi-injection to raise the exhaust gas temperature, opens the exhaust brake valve 24 and also closes the exhaust throttle valve 26 after the temperature has been raised, adds the exhaust pipe injection to the multi-injection, and raises the exhaust gas temperature to a final temperature of about 600° C. to burn the PM, thereby regenerating the DPD 25. In the manual regeneration, the target regeneration temperatures Ta, Tb explained with reference to FIG. 3 are also set and the integral time is counted in a similar manner.

The PID control of the exhaust pipe injection amount is explained below.

First, during the automatic regeneration, the exhaust gas temperature is detected by the exhaust gas temperature sensor 30b explained with reference to FIG. 1, and the ECU 32 determines the difference e between the above-described target regeneration temperatures Ta, Tb and the exhaust temperature and determines the operation amount M of exhaust pipe injection performed with the exhaust pipe injector 39 by the PID control based on the determined difference.

The operation amount M is represented by the following equation.

$$M = Kp \cdot e + Ki \cdot (1/Ti) \cdot \int e \, dt + Kd \cdot Td (de/dt)$$

In the equation above, Kp is a proportionality constant of proportional control, Ki is a proportionality constant of integral control, Kd is a proportionality constant of derivative control, Ti is an integral time, Td is a derivative time, and t is time.

Here, the operation amount M is determined by the sum total of the proportional control term, integral control term, and derivative control term. The actual exhaust pipe injection amount is determined by adding an operation amount of the base term to this operation amount M at a fuel pressure determined by the fuel pressure sensor 42 and in the valve opening time of the exhaust pipe injector 39.

In the PID control, during the traveling automatic regeneration, the exhaust gas temperature is high, the amount of exhaust gas is large, and the target regeneration temperatures Ta, Tb can be accurately controlled by adjusting the exhaust pipe injection amount.

When the vehicle is repeatedly rapidly accelerated or decelerated, or the vehicle travels downhill and the driver closes the exhaust brake valve during such automatic regeneration, where the exhaust pipe injection is continued, the temperature inside the DPD 25 can rapidly rise and the upper limit temperatures $Ta_L$, $Tb_L$ at which the exhaust pipe injection is possible can be exceeded due to fluctuations in the amount of exhaust gas. In such case, the exhaust pipe injection is interrupted to prevent the DPD 25 from melting through.

Figure 4A:
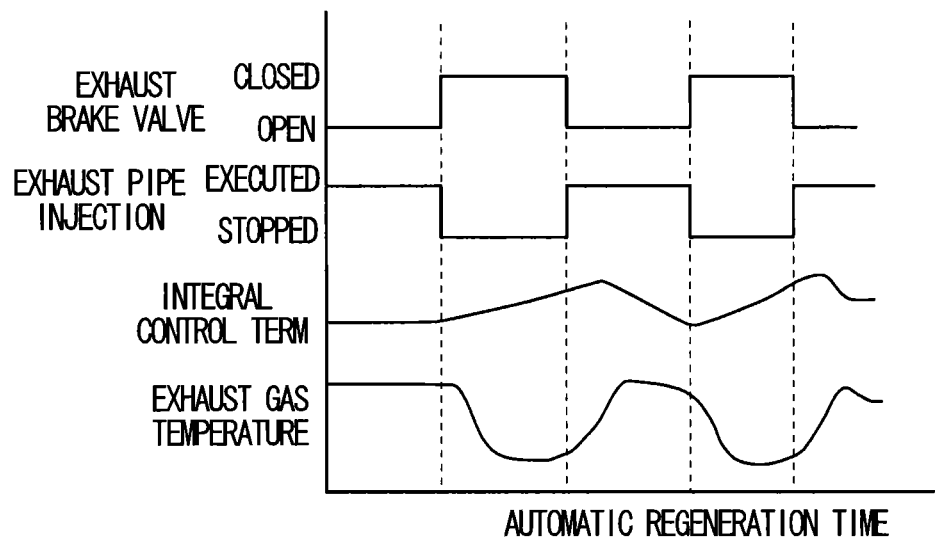
FIG. 4(a) is a chart in accordance with the present invention.
Figure 4B:
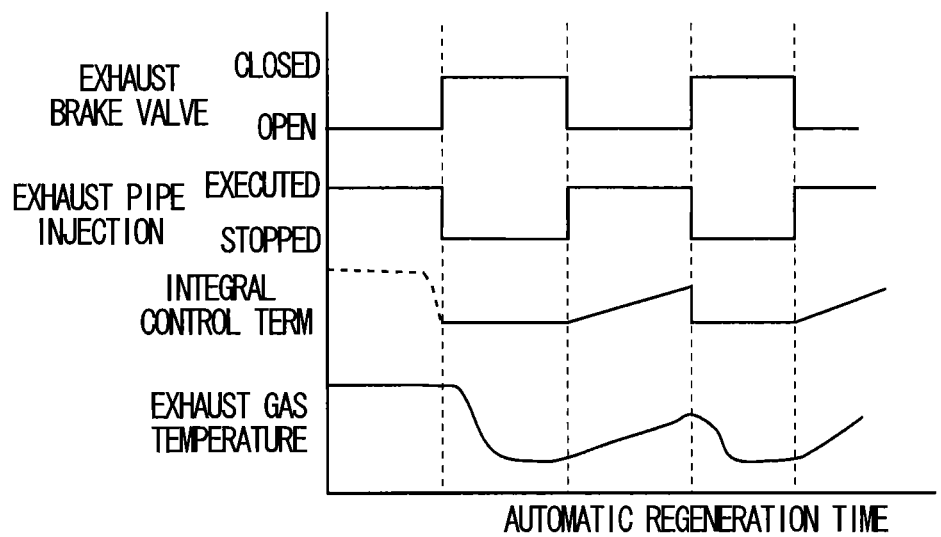
FIG. 4(b) is a chart of the conventional example.

In the conventional configuration, as shown in FIG. 4(b), when the exhaust brake valve is closed, the exhaust pipe injection is stopped and the PID control is also stopped at the same time, and when the exhaust brake valve is opened, the exhaust pipe injection is again performed by the PID control. However, in this case, the integral control term of the PID control is reset to zero since the PID control is stopped. As a result, the difference e is again integrated from the start of the PID control, and where the exhaust brake valve is thereafter closed again, the integral control term is again reset to zero. The resultant problem is that accurate control of the exhaust pipe injection amount is not performed, the exhaust gas temperature drops each time the exhaust brake valve is closed, control to the target regeneration temperatures Ta, Tb cannot be performed, the regeneration time is increased, and the regeneration is incomplete. Meanwhile, the injection amount of the exhaust pipe injector 39 can also drop under the effect of carbon deposition on the injector surface in the process of using the exhaust pipe injector 39, and the increase in the PID control speed is also desirable in terms of improving the durability of the exhaust pipe injector 39 against the adhesion of foreign matter.

Accordingly, in the present invention, as shown in FIG. 4(a), although the exhaust pipe injection is stopped when the exhaust brake valve is closed, the PID control is continued without a reset. As a result, even when rapid acceleration and rapid deceleration of the vehicle are repeated and the exhaust brake valve is frequently opened and closed, the integration of the difference e in the integral control term is continued. Therefore, when the exhaust brake valve is opened, the operation amount of this integral control term is added as the initial operation amount of the PID control to the exhaust pipe injection, thereby making it possible to maintain the exhaust gas temperature at the target regeneration temperatures Ta, Tb and improve PID controllability.

Further, when the exhaust brake valve is used as the vehicle travels along a long downhill road, in particular, when the condition of a low air temperature is also realized, the catalyst surface temperature of the DOC 28 can decrease even below the temperature measured by the exhaust gas temperature sensors 30a, 30b, for example, because the exhaust pipe injection is stopped. In this case, the entire amount injected into the exhaust pipe cannot actively react in the DOC 28 and white smoke is generated. Therefore, when the exhaust brake valve is continuously used for a time equal to or longer than a certain fixed time period (equal to or longer than a predetermined time period), the integral control term is reset to zero.

As described hereinabove, in accordance with the present invention, when the exhaust pipe injection amount is controlled by the PID control during traveling automatic regeneration, even if the exhaust brake is closed in rapid deceleration and the exhaust pipe injection is stopped, the PID control is continued and the difference is integrated in the integral control term, thereby making it possible to perform PID control of the exhaust pipe injection amount accurately even when the vehicle is re-accelerated after the deceleration.

The invention claimed is:

1. A vehicle exhaust gas purification system in which a diesel particulate defuser for collecting particulate matter contained in exhaust gas is connected to an exhaust pipe of a diesel engine, and when an amount of particulate matter in the diesel particulate defuser becomes equal to or greater than a predetermined amount, an exhaust gas temperature of the diesel engine is increased by performing exhaust pipe injection and the diesel particulate defuser undergoes automatic regeneration comprising:
   a sensor for detecting an exhaust gas temperature during the regeneration;
   an exhaust gas valve in the exhaust pipe; and
   an engine control device including a proportional integral derivative controller, which device is configured to receive the exhaust gas temperature detected by the sensor, to determine a difference between the detected exhaust gas temperature and a target regeneration temperature, to control an exhaust pipe injection amount using proportional integral derivative control based on the difference, and
   when an exhaust brake valve is closed during traveling automatic regeneration, the exhaust pipe injection is stopped and calculation of an integral control term by the proportional integral derivative control is continued without a reset of the proportional integral derivative control, and
   when the exhaust brake valve is opened, the integral control term that has been continuously calculated is taken as an initial operation amount.

2. The exhaust gas purification system according to claim 1, wherein the proportional integral derivative control is reset when the exhaust brake valve is continuously closed for a time equal to or longer than a predetermined time.

3. The exhaust gas purification system according to claim 1, wherein the proportional integral derivative control is reset when the vehicle is stopped after deceleration.

4. The exhaust gas purification system according to claim 1, wherein the exhaust pipe injection is continuously performed by the proportional integral derivative control when the exhaust brake valve is opened and the vehicle is decelerated.

* * * * *